Nov. 16, 1954 W. MORRIS 2,694,512
CONDIMENT SHAKER
Filed May 15, 1951 2 Sheets-Sheet 1
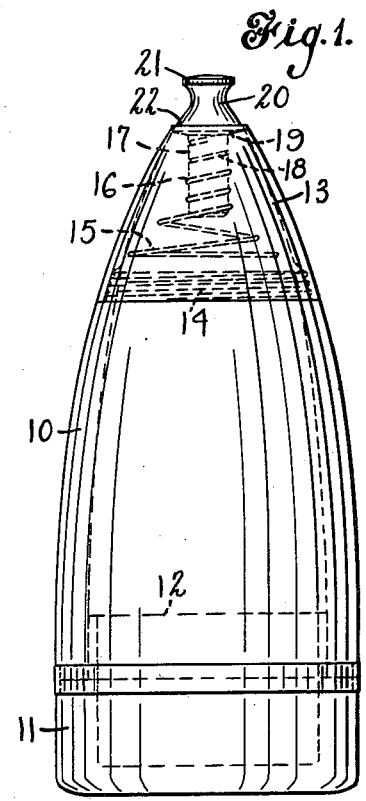
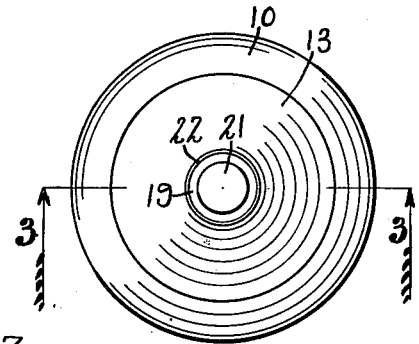
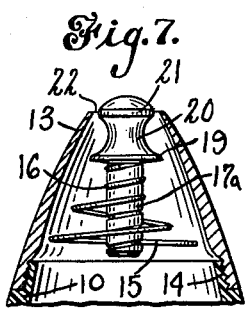
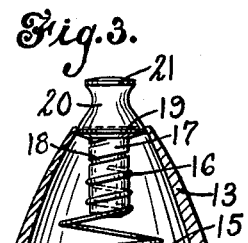
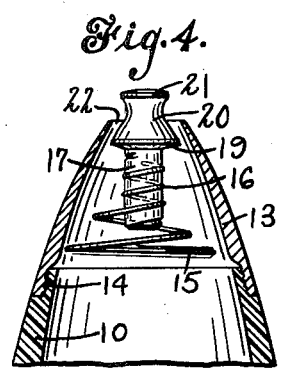
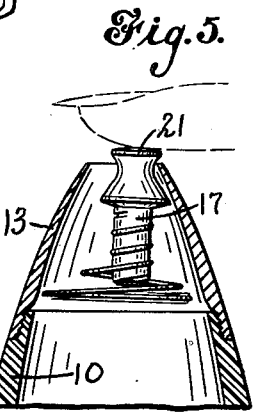
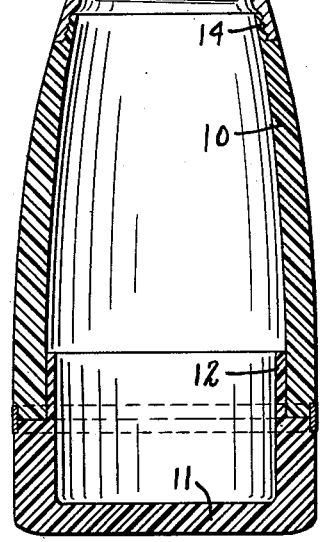
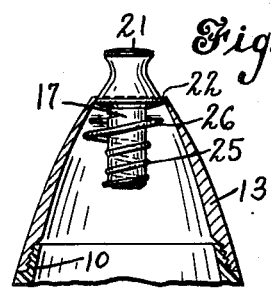
INVENTOR
William Morris
BY
Rockwell & Bartholow
ATTORNEYS Nov. 16, 1954 W. MORRIS 2,694,512
CONDIMENT SHAKER
Filed May 15, 1951 2 Sheets-Sheet 2
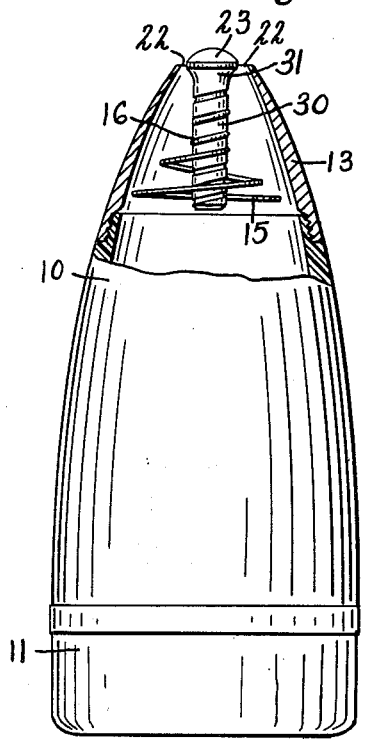
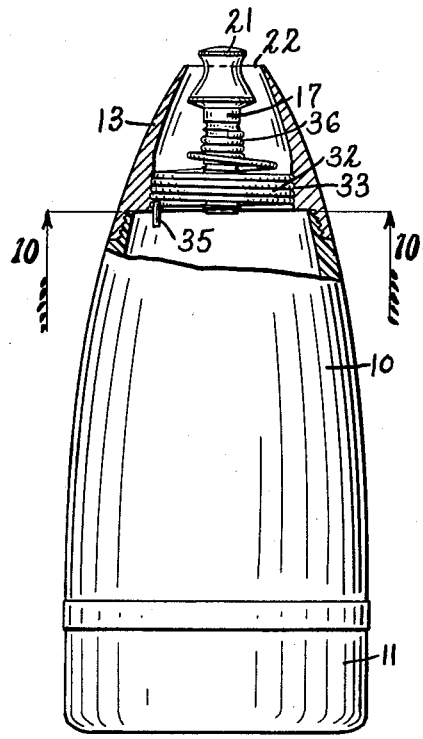
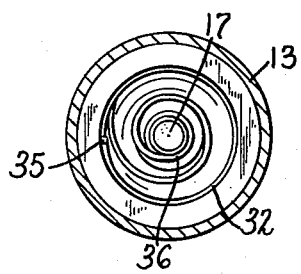
INVENTOR
William Morris
BY
Rockwell & Bartholow
ATTORNEYS United States Patent Office 2,694,512
Patented Nov. 16, 1954

2,694,512

CONDIMENT SHAKER

William Morris, New Haven, Conn.

Application May 15, 1951, Serial No. 226,487

3 Claims. (Cl. 222—501)

This invention relates to a condiment shaker and more particularly to a condiment shaker of improved construction such that the size of the opening through which the condiment is dispensed may be readily varied at the will of the user to regulate the flow of the condiment.

In the use of condiment shakers, it is often desirable to close the outlet opening or openings entirely if it is desired to carry the shaker from place to place, and also at other times such as when the shaker is filled from the bottom. It is also desirable to vary the size of the outlet opening or openings so as to vary the flow of condiment in order to dispense more or less. For example, if the shaker is used at the table, it may be desirable to provide a very gradual flow. On the other hand, if it is used during cooking and it is desired to secure a relatively large quantity of salt, for example such as half a teaspoon of salt, it will be desirable to increase the flow so as to obtain this amount quickly.

Also, it is often found that the opening or openings in a condiment shaker become clogged, and it is desirable to have some means of relieving this condition so that a flow of condiment may be obtained, and all of the above features should be provided in a structure which is relatively economical to manufacture.

In the present construction I provide a condiment shaker having an outlet opening in which is mounted a plug which may be adjusted to close the opening entirely or to provide a desired effective size for the outlet opening. Moreover, the plug which serves as an adjustable valve for the opening is supported by a spring into which the plug is threaded so that the plug is not only capable of a threaded adjustment to set it at any desired position with respect to the nozzle opening, but also may be temporarily and quickly moved to any desired position by pressure applied to the plug which is permitted to move by reason of its spring support, it being spring pressed toward the opening or upper end of the container.

As the plug is threaded into the spring, it also may be moved to one side when depressed so that the finger of the user by which the plug is depressed will not cover the opening in the body of the container. As stated above, this plug may not only be threadedly adjusted in the spring to regulate the effective size of the nozzle opening to give any desired flow of condiment, but may also be adjusted to a position in which the nozzle opening is entirely closed.

One object of the invention is to provide a condiment shaker having means for adjusting at will the effective size of the outlet opening or for closing this opening entirely.

Another object of the invention is to provide a condiment shaker having means by which the effective size of the outlet opening may be adjusted by pressure of the finger upon a spring pressed member.

Still another object of the invention is to provide a condiment shaker in which the effective size of the outlet opening may be temporarily and quickly varied in size to secure a relatively large flow of material therefrom, and in which the parts, when released will automatically return to their original adjusted positions.

Still another object of the invention is to provide a condiment shaker having an outlet opening regulated by a spring pressed plug, the plug being threaded into the spring for adjustment relatively thereto so that it may be adjusted to any desired position in which it would be retained, and also may be pressed inwardly against the pressure of the spring so that its position may be quickly and temporarily changed, the plug returning to its original adjusted position when the pressure is released.

To these and other ends the invention consists in the novel features and combinations of parts to be hereinafter described and claimed.

In the accompanying drawings:

Fig. 1 is a side elevational view of a condiment shaker embodying my invention;

Fig. 2 is a top plan view thereof;

Fig. 3 is a sectional view on line 3—3 of Fig. 2;

Fig. 4 is a sectional view of the upper part of the condiment shaker showing the plug or valve in a position lower than that shown in Fig. 3;

Fig. 5 is a view similar to Fig. 4 showing the valve or plug pressed downwardly and laterally by the finger to quickly enlarge the effective size of the opening;

Fig. 6 is a sectional view of the upper portion of a condiment shaker showing a modified form of my invention;

Fig. 7 is a view similar to Fig. 6 showing a further modification;

Fig. 8 is a side elevational view partly in section of a modified form of plug or valve;

Fig. 9 is a view similar to Fig. 8 showing a modified form of my invention in which the spring is threadedly secured to the cap; and Fig. 10 is a sectional view on line 10—10 of Fig. 9.

To illustrate a preferred embodiment of my invention I have shown a condiment shaker comprising a container for the condiment which consists of a body portion 10, a cup-shaped base 11 which may be provided with an upwardly projecting circular flange 12 received frictionally in the lower part of the body 10 to hold the base in place.

At the upper portion of the body 10 is a cap 13 secured to the body in any desired way, such as by threads 14, so that it may be removed if desired to fill the container. It will be understood that in the present instance the container may be filled either by removal of the cup-shaped base 11 or by removal of the cap 13, but, if desired, only one of these parts may be made removable for the purpose of filling.

Within the cap 13 is mounted a spring which consists of relatively large coils 15 at its base and relatively small coils 16 adjacent its upper end to serve as a screw-threaded socket. The lower portion of the spring is secured in any desired way, such as by brazing or cementing to the cap 13 so that the spring is supported by the cap and removed therewith when the cap is removed. The coils are made larger at the lower end in order that they may extend outwardly to the inner surface of the cap to be secured thereto.

Threaded into the coils 16 of the spring is a stem 17 provided with a spiral groove 18 in which the coils 16 of the spring are received. At the upper end of the stem is a valve member or plug which comprises a base portion 19 of relatively large diameter, a reduced portion 20 of relatively small diameter, and a head 21 of larger diameter than the intermediate portion 20.

The cap 13 is provided with an opening 22 at its upper end, and the plug, as shown in Fig. 3, is seated in this opening with the base portion 19 of larger diameter closing the opening 22. As this portion of the plug is preferably substantially the same size as that of the opening so while it will pass through the opening, it will substantially close it when the stem is so adjusted that it lies in the opening 22.

Also, it will be noted that the reduced portion 20 of the stem is considerably smaller in diameter than the opening so that when this portion of the plug lies in the opening or opposite the edge thereof, there will be an outlet for the contents of the container. This position of the stem and plug is shown in Fig. 4 where, as will be noted, the plug has been screwed downwardly in the coils of the spring 16 until the reduced intermediate portion thereof lies opposite the opening. As the inner wall of the cap 13 is tapered upwardly and inwardly, and as the plug is also tapered from its restricted portion in each direction in a substantially hourglass shape, it will be seen that the effective size of the opening 22 around the plug may be varied as desired in order that the proper flow of condiment will be obtained merely by screwing the stem upwardly or downwardly in the coils 16 of the spring. It, of course, is not essential that the plug be of hourglass shape, it only being desirable that the portion 20 be reduced in size with respect to the base 19 which is designed to close the opening 22, as shown in Fig. 3, when it is not desired to dispense condiment from the container.

It may also be observed that when the parts are in the position shown in Fig. 3 when the dispenser is to be carried from place to place, the user may, by pressing downwardly on the upper portion 21 of the plug, open the outlet so as to dispense material the size of the opening, depending, of course, upon the limit to which the stem is depressed. Also with the parts in the position shown in either Fig. 3 or Fig. 4, the user may press downwardly upon the plug and also laterally to move it to the position shown in Fig. 5 in which a relatively large opening will be provided to dispense a relatively heavy flow of material so that the size of the opening may be temporarily and quickly changed either when the plug is in the position shown in Fig. 3 or Fig. 4. The spring support of the plug not only allows it to be depressed, but also allows it to be moved to one side, as shown in Fig. 5, so that the finger of the user will not cover the opening 22 when the plug is depressed.

The modification of my invention shown in Fig. 6 is substantially like that shown in Figs. 1 to 5 and described above except that in this case the smaller or thread coils 25 of the spring are positioned at its lower end and the larger coils 26 are at the upper end of the spring adjacent the opening 22. It will be understood, of course, that the larger coils 26 are secured to the cap 13, but in this instance these coils are not so large as the coils 15 previously described as the inner diameter of the cap is smaller toward its upper end. The operation of the device, shown in Fig. 6, is substantially like that described above.

It may be noted that in all forms of the invention the portion of the spring which constitutes the threaded socket grips the stem sufficiently so that the stem will be held in any position to which it is adjusted.

In Fig. 7 of the drawings it will be noted that the stem 17ª of the plug member is of sufficient length so that it will protrude through the spring. In this case the plug may be screwed to the position shown in this figure or even to a lower position by removing the cap and grasping the free end of the stem with the fingers. In this position the plug will be proof against tampering or change in adjustment as might be desirable when used in restaurants, for example, as it cannot be moved without removing the cap 13 to permit access to the inner end of the stem. As the outer end of the plug is also larger than the restricted portion 20, it will provide an adjustment of the effective size of the opening in this position. It can still be pressed downwardly slightly by the finger in the event that the opening becomes clogged so that the opening will be freed for normal operation and it, of course, may also be subject to minor adjustment by pressing inwardly on the outer end of the stem, and, of course, may be adjusted upwardly when desired by removing the cap so that the free end of the stem may be grasped by the fingers.

In Fig. 8 of the drawing, I have shown another modified form in which the spring portions 15 and 16 are substantially the same as shown in Fig. 3. The stem 30 is also grooved spirally to receive the spring as before but the shape of the upper end of the stem differs slightly from the modifications heretofore described. In this case the upper end of the stem is tapered in shape, as shown at 31, so as to provide adjustment of the opening 22, and at its upper end is provided with an enlarged head 23 which may be pressed by the fingers. In this case the body of the plug is not of hourglass shape but still provides most of the adjustments provided in the other modifications. The stem 30 is sufficiently long to project below the spring so that its free end may be grasped so that it may be screwed downwardly to such an extent that it cannot be manipulated from the outside.

In Fig. 9 of the drawing, I have shown a further modification which involves particularly the method of securing the spring to the cap. Instead of the spring being cemented or brazed to the cap, as has been done in the other modifications, the lower portion 32 of the spring is wound in relatively close spirals so as to form an external screw thread, and this is received in an internally threaded portion 33 of the cap 13. The end of the spring 35 may protrude downwardly, as shown, so that the spring may be grasped in order that it may be screwed up into position and thereby attached to the cap. As will be obvious when the spring is once screwed into place, it cannot readily be unscrewed as it is so arranged that rotation of the spring in a direction to unscrew it will tend to expand the coils of the spring and the resulting friction will prevent it from turning. This, therefore, is a convenient method to secure the spring to the cap, as when once in place it cannot be readily removed.

The upper portion 36 of the spring provides a screw-threaded socket within which the stem 17 of the plug or valve may be received as before. In this case the valve is of substantially the same form shown in Fig. 3.

While I have shown and described some preferred embodiments of my invention, it will be understood that it is not to be limited to all of the details shown, but is capable of modification and variation within the spirit of the invention and within the scope of the claims.

What I claim is:

1. A condiment shaker comprising a container having an outlet opening in the uper end thereof, a plug member having a stem portion received within the casing and having an enlarged and tapered portion adjacent said opening for cooperation therewith, and a coil spring having one end thereof secured to the container and disposed interiorly thereof for resiliently supporting the plug member, the spring providing a socket at the other end thereof receiving and having a threaded connection with said stem portion of the plug member for adjustment of said tapered portion of the plug member with respect to the container opening so that the plug member may be spring supported in spaced relation to the container to control the flow of condiment from said opening, the plug member extending through said opening and said tapered portion thereof also being adjustable with respect to the container opening by finger pressure on the plug member exteriorly of the container to vary the flow of condiment from said opening.

2. A condiment shaker comprising a substantially hollow body, a tapered substantially hollow cap detachably secured to the body and having a central dispensing opening formed therein, a plug member having a stem portion and having a tapered portion adjacent said opening for cooperation therewith, and a coil spring having one end thereof secured directly to the cap and disposed interiorly thereof for resiliently supporting the plug member, the spring providing a socket at the other end thereof receiving and having a threaded connection with said stem portion of the plug member for adjustment of said tapered portion of the plug member with respect to the cap opening so that the plug member may be spring supported in spaced relation to the cap to control the flow of material from said opening, the plug member extending through said opening and said tapered portion thereof also being adjustable with respect to said cap opening by finger pressure on the plug member exteriorly of the cap to vary the flow of material from said opening.

3. A condiment shaker comprising a substantially hollow body, a tapered substantially hollow cap detachably secured to the body and having a central dispensing opening formed therein, the cap being provided with an annular groove interiorly thereof, a plug member having a stem portion and having a tapered portion adjacent said opening for cooperation therewith, and a coil spring having a portion thereof seated in said groove formed in the cap for resiliently supporting the plug member, the spring having a portion thereof providing a socket receiving and having a threaded connection with said stem portion of the plug member for adjustment of said tapered portion of the plug member with respect to the cap opening so that the plug member may be spring supported in spaced relation to the cap to control the flow of material from said opening, the plug member extending through said opening and said tapered portion thereof also being adjustable with respect to said cap opening by finger pressure on the plug member exteriorly of the cap to vary the flow of material from said opening.

References Cited in the file of this patent

UNITED STATES PATENTS

| Number | Name | Date |
|---|---|---|
| 427,165 | Fickett | May 6, 1890 |
| 1,373,566 | Neukirchen | Apr. 5, 1921 |
| 1,414,621 | Burnam | May 2, 1922 |
| 1,628,106 | Booty | May 10, 1927 |
| 1,989,738 | Carson | Feb. 5, 1935 |